J. McCASKEY.
WIND SHIELD.
APPLICATION FILED NOV. 2, 1917.

1,278,698.

Patented Sept. 10, 1918.

Joseph McCaskey INVENTOR

BY
Geo. W. Bullard,
ATTORNEY

UNITED STATES PATENT OFFICE.

JOSEPH McCASKEY, OF WILKESON, WASHINGTON.

WIND-SHIELD.

1,278,698.

Specification of Letters Patent. Patented Sept. 10, 1918.

Application filed November 2, 1917. Serial No. 199,826.

*To all whom it may concern:*

Be it known that I, JOSEPH MCCASKEY, a citizen of the United States, residing at the town of Wilkeson, in the county of Pierce and State of Washington, have invented new and useful Improvements in Wind-Shields, of which the following is a specification.

My invention pertains to glass wind shields for automobiles and other motor driven vehicles. The objects of my improvement are, first, to provide a means whereby the glass of a wind shield directly in front of the driver will be kept dry and free from condensation at all times; and second, to provide a further means whereby said glass directly in front of the driver will be protected from rain in wet weather and kept dry and free from raindrops, thus securing a clear view to the driver during a rainy season.

I attain these objects by means of the device illustrated in the accompanying drawing in which—

Figure 1:
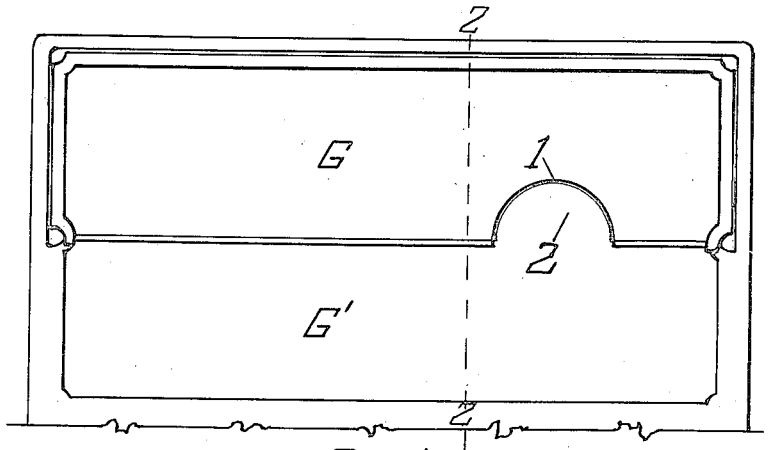
Figure 2:
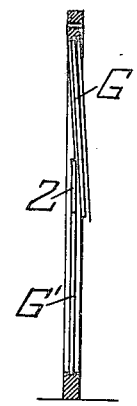
Figure 3:
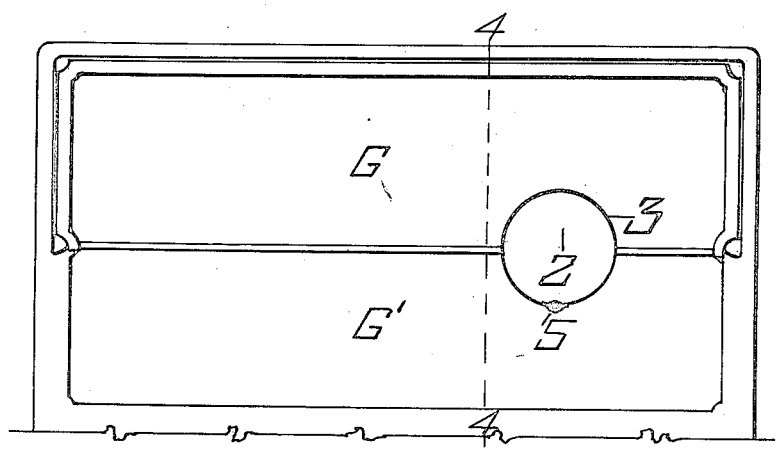
Figure 4:
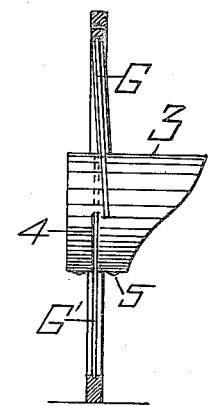
Figure 5:
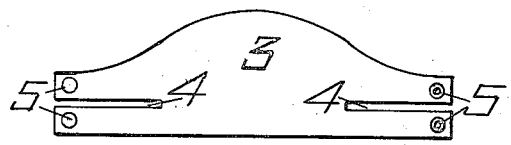

Figure 1 is a front view of a glass wind shield showing one form of my invention; Fig. 2 is a vertical section on line 2—2; Fig. 3 is a front view of my improved wind shield with my rain hood or vizor attached thereto; Fig. 4 is a vertical section on line 4—4 showing a side view of the rain hood and Fig. 5 is a view of the rain hood laid out flat.

Similar characters refer to similar parts in the several views.

It is a fact observed by drivers of automobiles that in cold, damp or foggy weather, the upper glass of a wind shield collects moisture by condensation so that a clear view cannot be had therethrough. It is also true that the lower glass being near the motor is kept warm and moisture does not collect thereon, leaving the same dry and clear at all times. The lower glass being below the eyes of the driver, I have conceived the idea of cutting a semicircular recess 1 in the upper glass G of the wind shield and a corresponding semicircular extension 2 in the lower glass G' to fit and extend into the recess 1. The extension 2 is designed to be directly in front of the driver's eyes, and being a part of the lower glass G' it is kept dry and clear so that he can see clearly therethrough, while the upper glass G may be made dim and obscure by condensation thereon. With this simple improvement I secure a wind shield in which the glass is always dry and clear before the driver's eyes and he can have a clear view ahead.

In stormy wet weather it is an observed fact that both glasses of a wind shield will become wet and so blurred by the rain drops that the driver cannot see clearly, particularly in the night time. To obviate this, I have conceived the idea of covering the extension 2 with a hood or vizor 3. This device is made of thin sheet isinglass, celluloid or other suitably flexible material as shown in Fig. 5. In each end edge is cut a slit 4, just wide enough to fit neatly to the thickness of the glass. The end edges are provided with glove or garment fasteners 5. The two ends are bent and fastened together by these fasteners, giving a cylindrical form to the hood or vizor, as seen in Figs. 3 and 4. It is then put in place by raising the upper glass G when the hood or vizor is slipped down over the extension 2 till the slits 4 securely engage the lower glass G'. The upper glass G is let down so the recess 1 fits about the hood and holds it securely in place. The hood or vizor thus in place during a rain storm so protects and shelters the glass extension 2 that no rain drops fall thereon and the glass is kept dry and free from blur, giving the driver a clear view. The air within the cylindrical hood so forms a cushion that no rain drops will hit the glass under the same, though the machine may be driven at great speed.

With my improved wind shield as thus described, comfort and assurance is given the driver and accidents will be avoided.

When not in use the hood or vizor may be laid out flat as in Fig. 5 and placed under a seat cushion or other flat receptacle. It may also be slipped over a rib or strap in the top of the car with the ends fastened together and be conveniently carried in that form.

In making my improvement to wind shields, I do not limit myself to exact dimensions or forms, but reserve the right to modify and vary the same as occasion and condition may require.

Having described my invention, I claim:

1. A wind shield for motor driven vehicles, said wind shield having a lower and an upper glass therein, an extension in the upper edge of said lower glass and made to coincide with and fit into a recess in the lower edge of said upper glass, and said extension being to one side of said wind shield directly in front of the driving wheel as described and for the purposes set forth.

2. A wind shield for motor driven vehicles comprising an upper glass and a lower glass, a semicircular recess in the lower edge of said upper glass, a semicircular extension from the upper edge of said lower glass made to fit into and coincide with said recess, and said semicircular extension being in line with the forward vision of the driver.

3. A wind shield for motor driven vehicles, comprising an upper glass and a lower glass, a semicircular recess in the said upper glass, said recess suitably located in line with the driver's forward vision, a semicircular extension from the upper edge of said lower glass, said extension corresponding with and fitting into said semicircular recess in said upper glass, and a flexible rain hood or vizor fitted over and around said semicircular extension as described and for the purposes set forth.

4. A wind shield for motor driven vehicles, comprising an upper glass and a lower glass, a semicircular recess in said upper glass, said recess suitably located in line with the driver's forward vision, a semicircular extension from the upper edge of said lower glass, said extension corresponding with and fitting into said semicircular recess in said upper glass, said semicircular extension sheltered by a rain hood or vizor, said hood or vizor made of suitably flexible material, slits in the end edges of said hood or vizor and means for fastening said hood end edges together, whereby said hood or vizor is made cylindrical in form to fit over and about said semicircular extension and onto said lower glass of said wind shield.

JOSEPH McCASKEY.